No. 797,739. PATENTED AUG. 22, 1905.
W. MEER.
VALVE.
APPLICATION FILED JULY 29, 1904.

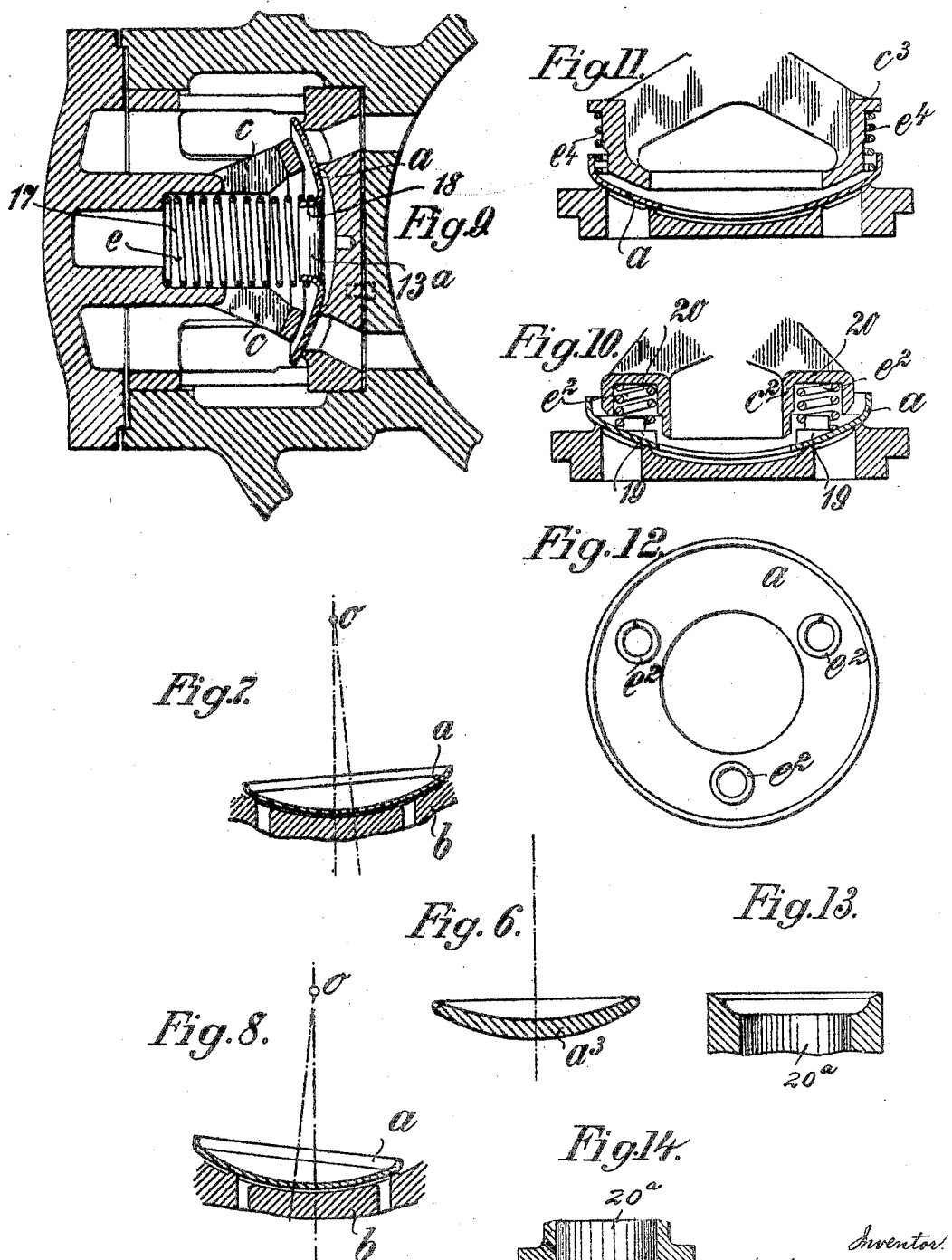

UNITED STATES PATENT OFFICE.

WILHELM MEER, OF MÜNCHEN-GLADBACH, GERMANY.

VALVE.

No. 797,739.  Specification of Letters Patent.  Patented Aug. 22, 1905.

Application filed July 29, 1904. Serial No. 218,733.

*To all whom it may concern:*

Be it known that I, WILHELM MEER, a subject of the King of Prussia, German Emperor, residing at Viersenerstrasse 19, München-Gladbach, Germany, have invented certain new and useful Improvements in Valves; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to lift-valves for compressors, blowing-engines, pumps, and the like, whose valves have a spherical form, either concave or convex, corresponding to that of their seat.

I am aware that lift-valves having a spherical face have been made; but these valves have been provided with stems and are not capable to move in all directions.

The present invention has for its object a valve capable of being lifted from its seat and also capable of having any desired lateral position and turning within limits and still effectively seat itself.

Referring to the drawings, in which like parts are similarly designated, Figure 1 is a section showing a valve whose convex spherical surface coöperates with a seat of complementary form. Fig. 2 is a section of a similar valve spring-urged. Fig. 3 is a modification of a simple lift-valve, the lateral movement and the lift of which is limited by a ring. Fig. 4 is a valve whose concave face coöperates with a convex seat. Figs. 5 and 6 are sections of modifications of the form of the valve itself. Figs. 7 and 8 illustrate permissible lateral movement of the valve to still maintain an effective closure. Fig. 9 shows a structure of valve capable of being used in a horizontal position. Figs. 10 and 11 are sections showing modifications of spring-urged valve. Fig. 12 is a plan view of the valve $a$, Fig. 10. Figs. 13 and 14 show other forms of the seat. In Figs. 13 and 14 the seat has a single port $20^a$.

Referring more particularly to Fig. 1, $a$ is a valve having a spherical surface and a central opening 13 and flange 14, the closing-surface of the valve being convex. This valve seats on a concave element 15, having circular seating-surfaces $b$, projecting above the seat and arranged on the surface of a sphere, whose radius is the same as that of the face of the valve, and distanced therefrom is a spider $c$, which serves to limit both the upward movement or lift of the valve as well as its lateral movement or play.

The operation is as follows: Air or other compressible fluid will pass through ports 16, which are preferably substantially annular save for the ribs $x$, and lifts the valve $a$ from its seat and forces it against the spider $c$, permitting the air to pass through the ports 16, around the valve and partly through the central opening 13 and the spider. The valve in reseating can shift laterally in any direction, the limit of movement being the distance between the flange 14 of the valve and the arms of the spider $c$ or the ring $y$, carried at the extremities of the spider-arms, so that the valve in falling will always seat perfectly.

In Fig. 2, which is similar in structure to Fig. 1, the spider $c$ has a central recess 17, in which is a spring $e$, urging the valve to its seat, the opening through the valve instead of being circular being sections of annuli $13^a$. The operation of this valve is precisely the same as that of Fig. 1 with the exception that it takes a greater pressure to lift this valve than that shown in Fig. 1. The spring $e$ is free to bend in any lateral direction, and thereby partakes of any lateral movement of the valve.

In Fig. 3 the valve $a$ is retained by ring $d$, the lift and lateral motion of the valve being limited by said ring.

Fig. 6 is a section of a valve $a^3$ in the form of a concavo-convex lens.

Figs. 7 and 8 show extreme right and left positions of the valve $a$, which has a movement about the center $o$ of the sphere of which the valve forms a portion.

Figure 1:
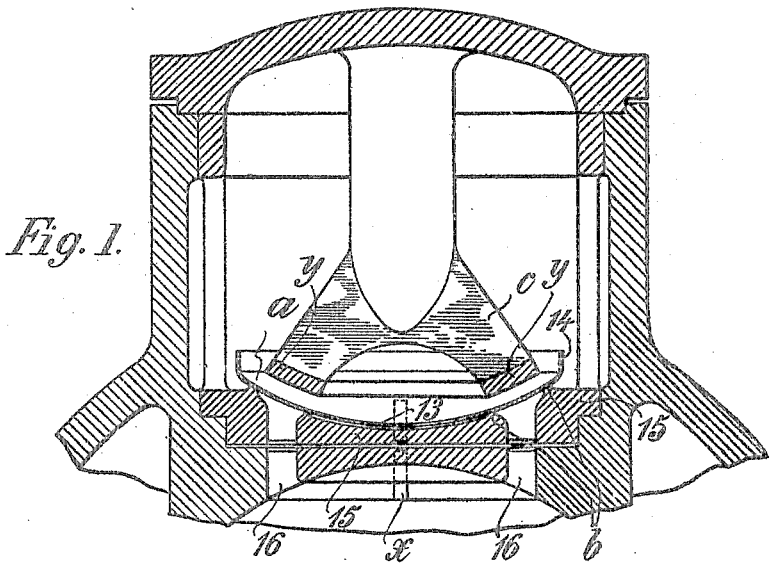
Figure 2:
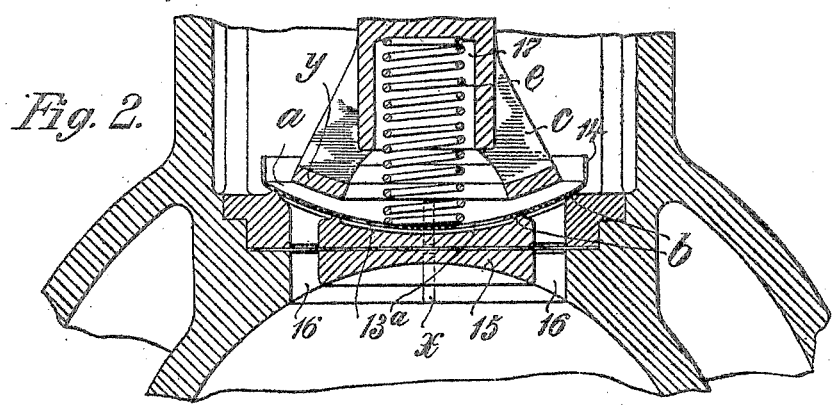
Figure 3:
Figure 4:
Fig. 4 is a spherical valve of the form reciprocal or complementary to that shown in Fig. 1—that is, the seat instead of being concave is convex and the concave face of the valve $a$ is seated on the ring-surfaces $b$. The valve is provided with a flange, as in the other forms, and limited in its lateral as well as vertical movement by the spider $c$.
Figure 5:
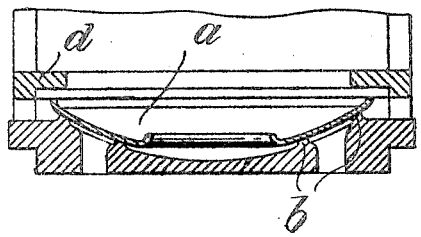
Fig. 5 is a section through the hollow valve $a^2$, which is in the form of a plano-convex lens.
Figure 5:
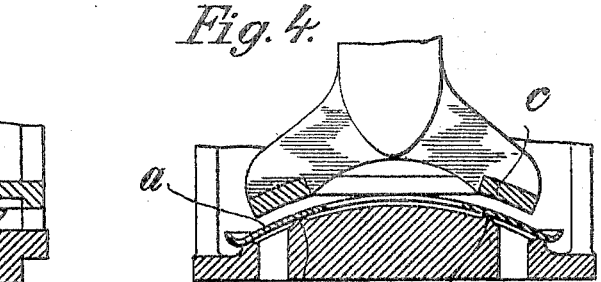

In Fig. 9 the valve is shown made of sheet metal or cast having a central perforation $13^a$, surrounded by an upturned flange 18. The spider $c$ has a central bore or socket 17, in which is closely fitted a coil-spring $e$, the flange 18 fitting within the center of the spring, said spring projecting beyond its socket in the spider, the free end carrying the valve. This structure permits the use of a valve in a horizontal axial position.

Figs. 10 and 12 show the valve $a$ provided with lugs 19 and the ring of the spider $c^2$ provided with recesses 20, three such recesses and lugs being provided. Within the recesses are springs $e^2$, taking over the lugs and limiting the lateral movement of the valve.

In Fig. 11 the spider is shown having a circular rim $c^3$, around which is a coil-spring $e^4$, taking within the flange and into the cavity of the valve, thus serving to limit the movement of the valve. Such valves can readily be made from cast or sheet material, are easily removable, and have no complicated parts or wearing-surfaces. They may be termed "self-grinding" valves, their movement being such as to maintain a ground seat.

In Figs. 13 and 14 other forms of the seat are shown, which can be used with all the described forms of valve.

Having thus described my invention, what I claim as new therein, and desire to secure by Letters Patent, is—

1. A valve comprising a casing provided with a valve-seat, an unguided valve-body free to move in any direction, and means in the casing to limit the movements of said body relatively to its seat.

2. A valve, comprising a casing provided with a spherical valve-seat, an unguided valve-body provided with a complementary seating-surface and free to move in any direction, and means in the casing to limit the movements of said body relatively to its seat.

3. A valve, comprising a casing provided with a valve-seat, an unguided valve-body provided with a concave seating-surface and free to move in any direction, and means in the casing to limit the movements of said body relatively to its seat.

4. A valve, comprising a casing provided with a valve-seat, an unguided valve-body free to move in any direction, one or more springs acting on said valve-body to urge the same to its seat, said spring or springs, free to partake of the movements of the valve-body, and means in the casing to limit the movements of said valve-body relatively to its seat.

5. A valve, comprising a casing, provided with a valve-seat, an unguided valve-body provided with an encompassing-flange and free to move in any direction, an abutment in the valve-casing distanced from the valve-body and coöperating with its flange to limit the movements of said body relatively to its seat.

6. A valve, comprising a casing provided with a spherical seat having ports near its edges, an unguided valve-body provided with a complementary seating-surface, an encompassing flange and a central passage, said valve-body free to move in any direction, an abutment in the valve-casing coöperating with the aforesaid flange to limit the movements of the valve-body relatively to its seat, and one or more springs acting on said body and free to partake of its movements.

7. A valve, comprising a casing provided with a spherical valve-seat, an unguided sheet-metal valve-body provided with a complementary seating-surface and free to move in any direction, means in the casing to limit the movements of the valve-body relatively to its seat and one or more springs acting on the valve-body and partaking of its movements.

8. The combination with a spherical seat, of a valve having a form complementary to the seat and a flange, a spider carrying a ring at its end distanced from the seat above the valve, said ring limiting the lift and lateral movement of the valve.

9. The combination with a spherical seat, of a valve having a complementary form, a spider carrying a ring on its end and having a socket, a spring held in the socket, the free end of which engages the valve, substantially as described.

10. The combination with a spherical seat, of a valve having a complementary form, a spider carrying a ring on its end held distanced from the seat and a plurality of springs in the spider, each engaging the valve, substantially as described.

In testimony that I claim the foregoing as my invention I have signed my name in presence of two subscribing witnesses.

WILLY MEER.

Witnesses:
PETER LIEBER,
WILLIAM ESSENWEIN.